F. Reuthe,
Jaw Trap,
№ 21,302.   Patented Aug. 24, 1858.
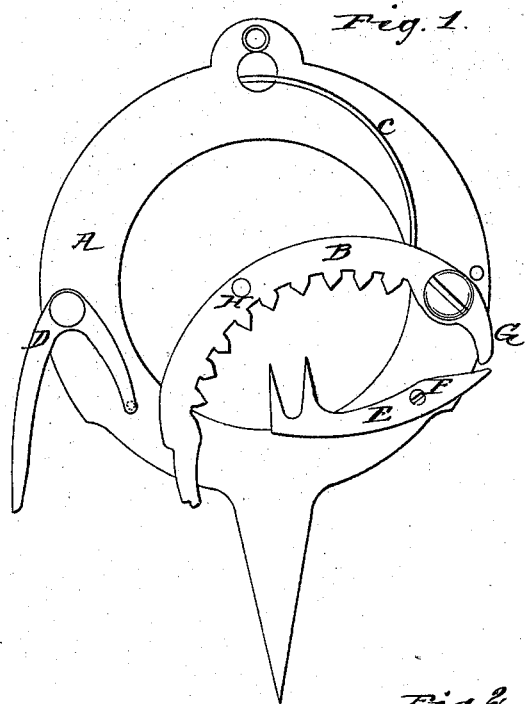
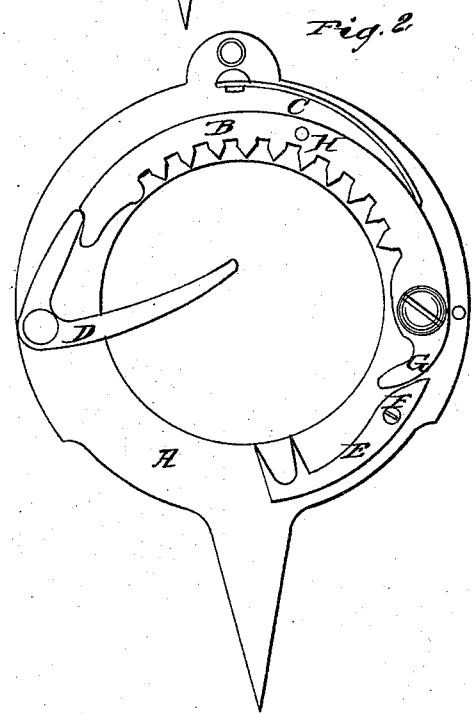

UNITED STATES PATENT OFFICE.

FREDERICK REUTHE, OF HARTFORD, CONNECTICUT, ASSIGNOR TO MORITZ LOTH, OF SAME PLACE.

TRAP FOR ANIMALS.

Specification of Letters Patent No. 21,302, dated August 24, 1858.

*To all whom it may concern:*

Be it known that I, FREDERICK REUTHE, of the city of Hartford, county of Hartford, and State of Connecticut, have invented a new and useful Improvement in the Mode of Constructing Rat-Traps; and I do hereby declare that the following is a correct description thereof, reference being had to the accompanying drawing and to the letters of reference marked thereon.

The nature of my invention consists in the construction of a metallic trap of a flat circular form to be placed over or near the places of resort of rats, moles or other small class of animals.

To enable others skilled in the art to make and use my invention, I will proceed to describe its construction and operation.

*The drawing.*—Figure 1 is a view of the trap when discharged; Fig. 2, ditto when set.

I construct my trap in the manner as shown in the drawing and description.

The circular flat body part A, I stamp out of sheet iron plate, formed with a sharp spike at the bottom to stick into the ground or into wood or any substance that may be found generally before the hole or haunt of the animal to be captured.

In the top part of the body A I form an eye or some similar device so that in some cases it may be hung up.

B is the notched yoke which is thrown down by force and action of the spring C.

D is the trigger and lever combined, the lever when set, projecting part of the way across the hole of the body A so that any animal passing through must touch the same and discharge the trap, throwing the notched yoke by the action of the spring C, suddenly on to the animal, at the same instant the forked lever E flies up and pierces him below.

The sharp forked point lever E is hung on a pivot F, so that when the yoke B is turned up and set it fits to the lower end at G, which is of an eccentric curve and the fork end being turned flush on the body plate (see Fig. 2). When the yoke falls it suddenly throws up the fore end and the points pierce the body of the animal and holds him fast.

H is the pin to pull up the yoke to set the trap.

This is a simple cheap and effective trap for capturing all kinds of the small class of animals, and can be enlarged for other kinds.

What I claim as my invention and desire to secure by Letters Patent is—

The notched curved yoke B, and the application and combination of the various parts to form a rat trap in the manner and for the purpose substantially as herein set forth and described.

FREDERICK REUTHE.

Witnesses:
WM. VINE,
MORITZ LOTH.